United States Patent [19]

Elkjaer

[11] Patent Number: 4,848,993

[45] Date of Patent: Jul. 18, 1989

[54] CYCLONE

[75] Inventor: Hans P. Elkjaer, Copenhagen, Denmark

[73] Assignee: F. L. Smidth & Co. A/S, Denmark

[21] Appl. No.: 119,552

[22] Filed: Nov. 12, 1987

[30] Foreign Application Priority Data

Mar. 25, 1987 [GB] United Kingdom ................ 8707143

[51] Int. Cl.⁴ ............................................ B01D 45/12

[52] U.S. Cl. .................................... 55/459.1; 55/204; 210/512.1

[58] Field of Search ................ 55/204, 205, 456, 457, 55/459.1–459.5, 460; 210/512.1, 512.2

[56] References Cited

U.S. PATENT DOCUMENTS

| | | | |
|---|---|---|---|
| 575,561 | 1/1897 | Bingham | 55/459.1 X |
| 1,344,146 | 6/1920 | Peck | 55/459.1 |
| 2,271,634 | 2/1942 | Fletcher et al. | 55/459.1 |
| 2,295,101 | 9/1942 | Dunham | 55/459.5 |
| 2,590,754 | 3/1952 | Cline | 55/204 |
| 2,786,547 | 3/1957 | McCartney | 55/459.5 |
| 3,288,300 | 11/1966 | Bouchillon | 55/459.1 X |
| 3,413,776 | 12/1968 | Vytlacil | 55/459.1 X |
| 3,513,642 | 5/1970 | Cornett | 55/459.5 X |
| 3,745,752 | 7/1973 | Gallaer | 55/459.5 X |
| 3,850,816 | 11/1974 | Koch | 210/512.1 |
| 3,883,332 | 5/1975 | Llewelyn et al. | 55/459.5 |
| 3,898,068 | 8/1975 | McNeil | 55/459.1 X |
| 4,011,068 | 3/1977 | Llewelyn et al. | 55/459.5 |
| 4,175,036 | 11/1979 | Frykhult | 210/512.1 X |
| 4,624,691 | 11/1986 | Schneider | 55/459.1 X |
| 4,662,909 | 5/1987 | Dürr | 55/459.2 X |

FOREIGN PATENT DOCUMENTS

| | | | |
|---|---|---|---|
| 624309 | 7/1961 | Canada | 55/459.1 |
| 714367 | 7/1965 | Canada | 55/459.5 |
| 959506 | 3/1957 | Fed. Rep. of Germany | 55/459.1 |
| 2049651 | 4/1972 | Fed. Rep. of Germany | 55/459.2 |
| 8416280 | 6/1980 | Japan . | |
| 122283 | 7/1971 | Norway | 55/459.5 |
| 762070 | 11/1956 | United Kingdom | 55/459.2 |
| 773414 | 4/1957 | United Kingdom | 55/459.3 |
| 1434091 | 4/1976 | United Kingdom . | |
| 1453215 | 10/1976 | United Kingdom . | |

OTHER PUBLICATIONS

Duda: "Cement Data Book", 2nd Edition, pp. 494–496, 1977.

*Primary Examiner*—Robert Spitzer
*Attorney, Agent, or Firm*—Brumbaugh, Graves, Donohue & Raymond

[57] ABSTRACT

A cyclone for treating pulverous raw material suspended in a hot gas stream, for use, for example, in a suspension preheater plant for treating cement raw materials and similar materials, comprises a tubular chamber with a vertical axis, a cone shaped bottom with a central outlet for precipitated material, a central outlet for hot gases at the top of the chamber and a tangential inlet for hot air. The inlet has a chamfered wall causing the suspension stream entering the cyclone through the duct leading to the inlet to be deflected outwards against the inner surface of the chamber wall and downwards into the cyclone chamber.

8 Claims, 1 Drawing Sheet

CYCLONE

BACKGROUND OF THE INVENTION

The invention relates to a precipitator cyclone for treating pulverous material suspended in a gas stream. Such cyclones have for several decades been commonly used as integrated parts in preheater installations coupled before rotary kilns and/or calciners in which cement and similar raw materials are burned and sintered into clinker. Such cyclones represent extremely suitable vessels for precipitating the raw materials from their suspension for preheating purposes in a hot air or gas. Suspension preheaters of this type may be used either in one string or multistringed, each having a number of cyclone stages, for instance four or five, and are known from numerous patent descriptions, such as GB-A-No. 1434091 and GB-A-No. 1453215. The hitherto generally preferred precipitator cyclone for these preheaters have been of the reverse-flow type with a vertical axis and a tangential hot air inlet known for instance from JP-A-No. 84162/80 (FIGS. 1-4) or from Duda: "Cement Data Book", 2nd Edition, paragraph 24.6.2 (page 494–496), Macdonald and Evans, London, 1977.

In a preheater kiln system there is a close connection between the pressure drop of the gases passing through the system and the most economic way of running the system. Thus the savings in kiln dimensions by means of suspension preheaters and the use of stationary precalciners involve also an increase of the pressure drop and presently a drop of 700–1000 mm WG (28–40 in. WG) is considered allowable in such a system, most of the drop occurring in the preheater. The corresponding specific energy of the kiln exhaust gas amounts to 10–15 kWh/mt (0–14 kWh/st) clinker and it is therefore desirable to try to reduce this energy consumption by introducing preheaters with a lower pressure drop.

Hitherto known cyclone constructions suffer, however, from the drawback of a relatively large part of the suspension fed to the cyclone passing directly from the suspension inlet to the central exhaust outlet pipe even when the latter comprises a protruding prolongation into the cylclone vessel to improve the retention time, so that this part of the suspension has a very short retention time inside the cyclone, and in addition may further cause a rapid attrition of the protruding part of the pipe, all of which hamper the efforts of obtaining a lower pressure drop in the preheater.

The drawbacks could, however, be met by using precipitator cyclones with a higher separating efficiency than the cyclones of the described known type, especially in the lower stages of the preheaters, where it is for the above mentioned reasons also desirable to use cyclones without the protruding central gas exhaust pipe because the life of the protrusion even when made of refractory steel is normally very limited.

It is therefore the object of the invention to provide a precipitator cyclone which can be used for treating pulverous raw materials suspended in a hot gas stream in a preheater, the cyclone having a substantially high separating efficiency whilst avoiding the need of a protruding central pipe.

SUMMARY OF THE INVENTION

According to the invention this is obtained by a cyclone for separating pulverous material suspended in a gas stream, the cyclone comprising a tubular chamber with a vertical axis, a downwardly tapering outlet at the bottom of the chamber for precipitated material, a central outlet for gas at the top of the chamber and a tangential inlet duct for leading the gas stream into the upper part of a side wall of the chamber, characterized in that, where the inlet opens into the chamber, the inlet is defined at is upper portion nearest to the chamber axis, by a chamfered wall which slopes, in the direction of gas stream flow, downwardly and radially outwardly of the chamber.

With this construction the suspension stream passing through the inlet duct into the cyclone will receive a deflection forcing it radially outwards against the inner surface of the, usually cyclindrical, tubular chamber wall, and downwards in the chamber, and thus obtaining the desired longer retention time and therefore also cause the higher degree of material separation in the cyclone.

Where the inlet duct opens into the chamber, the bottom of the inlet duct is preferably inclined downwardly radially inwardly of the chamber. This avoids an undesirably large horizontal shelf inside the cyclone on which precipitated material might accumulate.

The chamfered wall may obstruct up to 20% of the cross section of the inlet duct immediately upstream of the chamfered wall. The shape of the obstruction, as seen looking along the inlet duct towards the chamber may be either triangular, if the inlet is of the more commonly used rectangular slope in cross section, or a segment of a circle if the inlet is of the round type. The chamfered wall preferably has, in the direction of gas stream flow, a length of up to twice the length of the downstream edge of the chamfered wall.

Obstructing more than 20% of the cross section of the inlet duct may cause a pressure drop in the cyclone of an amount which would eliminate the otherwise favourable effect of the construction.

Pilot plant tests with the cyclone according to the invention have shown that although the diameter of the cylindrical chamber was reduced by 25% compared to a cyclone of the known type the pressure loss was reduced by 20-25% whilst retaining a separating efficiency of 92%.

Further features of the invention will be apparent from the following detailed description.

Figure 1A:
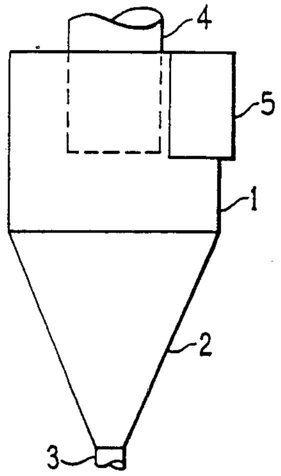
FIG. 1*a* shows a side view of a typical precipitator cyclone of known type.
Figure 1B:
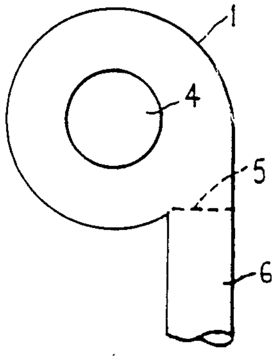
PRIOR ART FIG. 1b
FIG. 1*b* shows a plan of the FIG. 1*a* cyclone.
Figure 2A:
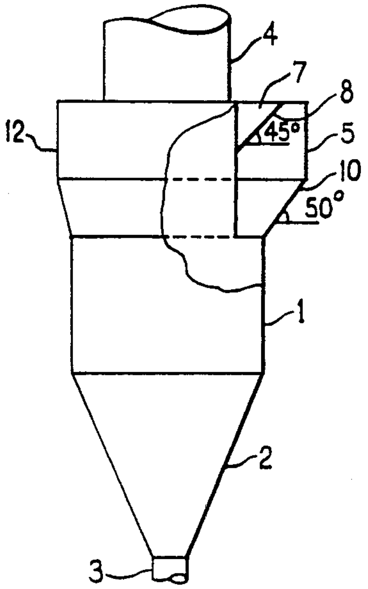
FIG. 2*a* shows a side view of an example of a precipitator cyclone according to the invention; and, FIG. 2*b* shows a plan of the FIG. 2*a* cyclone.
Figure 2B:
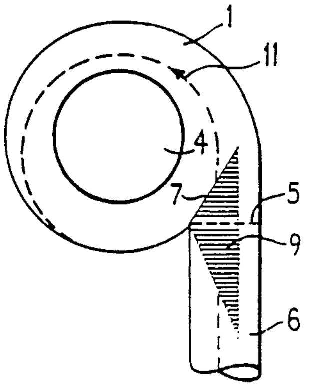

To the extent possible, the same reference numericals are used in both FIGS. 1 and 2.

DESCRIPTION OF THE PREFERRED EMBODIMENT.

The known reverse-flow cyclone type shown in FIG. 1 comprises a cylindrical chamber 1 with a vertical axis, a cone shaped bottom 2, an outlet 3 for material precipitated in the cyclone, a central pipe 4 with a protrusion into the chamber 1 and functioning as the exhaust gas outlet of the cyclone, a rectangular inlet 5 for hot air or gas in which the treated raw materials are suspended, the inlet 5 forming the downstream end of a hot air duct 6. Suspended material fed through the duct 6 to this cyclone will, in spite of the tangential introduction, to a substantial part pass directly from the inlet 5 into the central pipe 4 without spending much retention time in the cyclone vessel as such, and therefore leave the latter still suspended in the air or the gas instead of being precipitated from it. This undesired effect is increased if the central pipe 4 for other reasons has no protrusion into the cyclone.

The cyclone according to the invention and shown in FIGS. *2a* and *2b* comprises likewise a cylindrical chamber 1 with a vertical axis, a cone shaped bottom 2 with a material outlet 3, a central pipe 4 functioning as a gas exhaust duct and having no protrusion into the chamber and a suspension inlet 5 forming the end of a hot air duct 6. The inlet 5 is also here of the rectangular type, but modified into a trapeziumlike shape as it has at its upper part nearest to the cyclone axis a triangularly shaped obstruction 7, forming a chamfered prolongation of the cylindrical sidewall 12 and having a downstream edge 8 forming part of the inlet aperture. The edge 8 may have a declination to the horizontal of about 45° as shown.

To avoid an undesired shelflike construction inside the cylindrical cyclone chamber, cf. FIG. 1*a,* the bottom part 10 of the inlet 5 forms an oblique inner surface inclined downwardly radially inwardly of the chamber and having a preferred declination to the horizontal of about 50° as shown.

The cyclone also has a feature providing a desirable reduction of the total size of the vessel in that the main part 1 of the cylindrical chamber has a smaller diameter than the upper part 12 into which the inlet 5 discharges.

The obstruction 7 results from chamfering 9 of the upper wall of the duct 6 so that the latter slopes down to the free edge 8. The length of the chamfering is about twice the length of the edge 8. The chamfering together with the edge act smoothly on the stream of suspension entering the cyclone with a deflecting force which turns the stream outwards against the inner surface of the chamber wall and downwards into the cyclone as partly indicated by dotted line 11 in FIG. 2*b,* thus giving the suspension a desired increase of retention time in the cyclone together with a far better utilization of the total inner space of the vessel and thereby a reduced pressure loss and an equally better separating efficiency.

I claim:

1. A cyclone for separating pulverous material suspended in a gas stream, the cyclone comprising a tubular chamber with a vertical axis, a downwardly tapering outlet at the bottom of the chamber for precipitated material, a central outlet for gas at the top of the chamber and a tangential inlet duct for leading the gas stream into the upper part of a side wall of the chamber, characterized in that, where the inlet opens into the chamber, the inlet is defined at its upper portion nearest to the chamber axis, by a chamfered wall which slopes, in the direction of gas stream flow, downwardly and radially outwardly of the chamber and in that the central outlet for gas at the top of the chamber has substantially no protrusion into the chamber.

2. A cyclone according to claim 1, in which, where the inlet duct opens into the chamber, the bottom of the inlet duct is inclined downwardly radially inwardly of the chamber.

3. A cyclone according to claim 2, in which the chamfered wall obstructs up to 20% of the cross section of the inlet duct immediately upstream of the chamfered wall.

4. A cyclone according to claim 3, in which the chamfered wall has, in the direction of gas stream flow, a length of up to twice the length of the downstream edge of the chamfered wall.

5. A cyclone according to claim 2, in which the chamfered wall has, in the direction of gas stream flow, a length of up to twice the length of the downstream edge of the chamfered wall.

6. A cyclone according to claim 1 in which the chamfered wall obstructs up to 20% of the cross section of the inlet duct immediately upstream of the chamfered wall.

7. A cyclone according to claim 6, in which the chamfered wall has, in the direction of gas stream flow, a length of up to twice the length of the downstream edge of the chamfered wall.

8. A cyclone according to claim 1, in which the chamfered wall has, in the direction of gas stream flow, a length of up to twice the length of the downstream edge of the chamfered wall.

* * * * *